United States Patent
Bellar et al.

(10) Patent No.: US 11,834,272 B2
(45) Date of Patent: Dec. 5, 2023

(54) SYSTEM AND METHOD FOR AUTOMATED PRODUCT SORTING AND COORDINATED DELIVERY USING AUTONOMOUS DELIVERY VEHICLES WITHIN A FACILITY

(71) Applicant: WALMART APOLLO, LLC, Bentonville, AR (US)

(72) Inventors: Jason D. Bellar, Bella Vista, AR (US); Jeremy L. Velten, Bella Vista, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 18/180,695

(22) Filed: Mar. 8, 2023

(65) Prior Publication Data

US 2023/0219763 A1   Jul. 13, 2023

Related U.S. Application Data

(63) Continuation of application No. 17/478,508, filed on Sep. 17, 2021, now abandoned, which is a
(Continued)

(51) Int. Cl.
*B65G 1/137* (2006.01)

(52) U.S. Cl.
CPC .... *B65G 1/1376* (2013.01); *B65G 2203/0216* (2013.01)

(58) Field of Classification Search
CPC .............. B65G 1/1376; B65G 2203/0216
See application file for complete search history.

(56) References Cited

U.S. PATENT DOCUMENTS

| 4,678,390 A | 7/1987 | Bonneton |
| 5,730,252 A | 3/1998 | Herbinet |

(Continued)

FOREIGN PATENT DOCUMENTS

| WO | 2018012767 | 1/2018 |
| WO | 2019232239 | 12/2019 |

OTHER PUBLICATIONS

Fanuc America Corporation, Robotic Shelf Picking—IAM Robotics Automated Storage & Retrieval System (AS/RS). Retrieved online at: https://www.youtube.com/watch?v=h9eRDyZJzSA. 2 pages, Aug. 6, 2015.
(Continued)

*Primary Examiner* — Kyle O Logan
(74) *Attorney, Agent, or Firm* — Fitch, Even, Tabin & Flannery LLP (57) ABSTRACT

Systems, methods, and machine readable media are provided for automated product sorting and coordinated delivery using autonomous delivery vehicles within a facility. In exemplary embodiments, a system scans machine readable identifiers affixed to items, and sorts the items into two or more categories. A selected item is identified as scheduled to be picked up in-facility based on the scanning of the machine-readable identifier. An optimal route within the facility from the automated sorting device to an in-facility location is determined for a selected autonomous delivery vehicle based at least in part on at least one of facility traffic patterns, locations of other autonomous delivery vehicles, a number of items to be delivered, and additional tasks that can be performed by the selected autonomous delivery vehicle while delivering the item. The selected autonomous delivery vehicle navigates along the optimal route to the in-facility location to deliver the selected item to the in-facility location.

20 Claims, 7 Drawing Sheets

Related U.S. Application Data continuation of application No. 16/426,853, filed on May 30, 2019, now abandoned.

(60) Provisional application No. 62/678,457, filed on May 31, 2018.

(56) References Cited

U.S. PATENT DOCUMENTS

| | | | |
|---|---|---|---|
| 7,261,511 B2 | 8/2007 | Felder | |
| 7,591,630 B2 | 9/2009 | Lert, Jr. | |
| 10,248,120 B1* | 4/2019 | Siegel | G05D 1/0088 |
| 2002/0130065 A1* | 9/2002 | Bloom | B07C 3/00 |
| | | | 209/630 |
| 2002/0178074 A1* | 11/2002 | Bloom | G06Q 20/00 |
| | | | 705/26.81 |
| 2006/0020366 A1* | 1/2006 | Bloom | G06Q 20/00 |
| | | | 700/226 |
| 2012/0326840 A1* | 12/2012 | Frankenberg | G07F 17/13 |
| | | | 340/5.65 |
| 2016/0355337 A1 | 12/2016 | Lert | |
| 2017/0183159 A1 | 6/2017 | Weiss | |
| 2017/0286905 A1* | 10/2017 | Richardson | G06Q 10/0832 |
| 2018/0134388 A1* | 5/2018 | Gil | B64D 1/22 |
| 2018/0246526 A1* | 8/2018 | Wilkinson | G08B 21/182 |
| 2018/0341908 A1* | 11/2018 | Lert, Jr. | G06Q 10/00 |
| 2022/0002085 A1 | 1/2022 | Bellar | |

OTHER PUBLICATIONS

InVia Robotics, Robotics Operations Center. Retrieved online at: https://www.inviarobotics.com/how-we-do-it. 3 pages, 2019).

International Search Report and Written Opinion forApplication No. PCT/U82019/034698, dated Aug. 15, 2019, 13 Pages.

USPTO; U.S. Appl. No. 16/426,853; Notice of Allowance dated Jun. 22, 2021.

USPTO; U.S. Appl. No. 16/426,853; Office Action dated Jan. 25, 2021.

USPTO; U.S. Appl. No. 17/478,508; Notice of Allowance and Fees Due (PTOL-85) dated Dec. 14, 2022; (pp. 1-8).

* cited by examiner

Automated Product Sorting And Coordinated Delivery System 100

SCAN MODULE 102

SORTING MODULE 104

DISTRIBUTION MODULE 106

SYSTEM AND METHOD FOR AUTOMATED PRODUCT SORTING AND COORDINATED DELIVERY USING AUTONOMOUS DELIVERY VEHICLES WITHIN A FACILITY

RELATED APPLICATION

This application is a continuation application of U.S. application Ser. No. 17/478,508, filed Sep. 17, 2021, which is a continuation application of U.S. application Ser. No. 16/426,853, filed May 30, 2019, which claims priority to, and the benefit of, U.S. Provisional Application No. 62/678,457, filed May 31, 2018, the contents of all of which are incorporated herein by reference in their entirety.

BACKGROUND

In a retail facility, the delivery, unloading, and sorting of products at the facility is an important component of the efficient operation of the facility. These delivery, unloading and sorting processes often involve unloading items from an external delivery vehicle into the facility. Once within the facility, the items may be sorted into appropriate categories and then delivered to various parts of the facility.

SUMMARY

In one embodiment, a system for automated product sorting and coordinated delivery is provided. The system is configured to execute a scan module, a sorting module and a distribution module. The scan module when executed scans incoming items to determine the type of item. The sorting module when executed sorts the items into one or more categories, each category associated with one or more conveyors and with the items for each category forwarded to the appropriate conveyor after being scanned. The distribution module when executed determines an optimal route for an autonomous delivery vehicle to deliver an item from the sorting process to a tower apparatus for later pick-up by the customer. The optimal route is determined at least in part on at least one of facility traffic patterns, locations of other autonomous delivery vehicle, a number of items being delivered and additional tasks that can be performed by the autonomous delivery vehicle while delivering the item.

In another embodiment, a computer implemented method for automated product sorting and coordinated delivery is provided. The method includes scanning with an automated sorting device that includes a plurality of conveyors, machine readable identifiers affixed to a plurality of items. The method further includes automatically sorting the plurality of items into two or more categories, each category associated with one of the plurality of conveyors, and forwarding items in each category to one of the plurality of conveyors after being scanned. The method also includes identifying a selected item from the plurality of items to be picked up in-facility based on the scanning of the machine-readable identifier and determining an optimal route within the facility from the automated sorting device to the tower apparatus for the autonomous delivery vehicle, the optimal route based at least in part on at least one of facility traffic patterns, locations of other autonomous delivery vehicles, a number of items to be delivered, and additional tasks that can be performed by the autonomous delivery vehicle while delivering the item. The method additionally includes instructing the autonomous delivery vehicle to retrieve the item from one of the plurality of conveyors, and navigating the autonomous delivery vehicle along the optimal route to a tower apparatus to deliver the selected item to the tower apparatus.

In another embodiment, a non-transitory machine-readable medium is provided that stores instructions executable by a processing device. Execution of the instructions causes the processing device to implement a method for performing an automated product sorting and coordinated delivery. The method includes scanning with an automated sorting device that includes a plurality of conveyors, machine readable identifiers affixed to a plurality of items. The method further includes automatically sorting the plurality of items into two or more categories, each category associated with one of the plurality of conveyors, and forwarding items in each category to one of the plurality of conveyors after being scanned. The method also includes identifying a selected item from the plurality of items to be picked up in-facility based on the scanning of the machine-readable identifier and determining an optimal route within the facility from the automated sorting device to the tower apparatus for the autonomous delivery vehicle, the optimal route based at least in part on at least one of facility traffic patterns, locations of other autonomous delivery vehicles, a number of items to be delivered, and additional tasks that can be performed by the autonomous delivery vehicle while delivering the item. The method additionally includes instructing the autonomous delivery vehicle to retrieve the item from one of the plurality of conveyors, and navigating the autonomous delivery vehicle along the optimal route to a tower apparatus to deliver the selected item to the tower apparatus.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings.

DETAILED DESCRIPTION

Exemplary embodiments provide an automated product sorting and coordinated delivery system for one or more items. Items are received at a facility and processed. The items are processed using an automated sorting system that includes multiple conveyor belts that are each associated with one or more specific product categories. The automated sorting system, which may be, but is not limited to, a flexible automated sortation technology (FAST) system, scans machine-readable identifiers of each item being unloaded and diverts the item to its appropriate conveyor based on the identified category. The facility includes a tower apparatus, such as, but not limited to, a Cleveron™ tower system, or other specified location such as storage lockers where customers can retrieve items that are intended to be picked up in-facility. This may be the result of an online order having been placed. A computing device executes a distribution module which selects an autonomous delivery vehicle from among one or more autonomous delivery vehicles in the facility to deliver the item to the tower (or other location). The selection may be based on a number of factors as described further herein. The distribution module also calculates an optimal route from the sortation system conveyor to the tower (or other location) for the selected autonomous delivery vehicle so that the ordered item may be picked-up by a customer. The optimal route may be based at least in part on at least one of facility traffic patterns, locations of other autonomous delivery vehicles within the facility, a number of items to be delivered, and additional tasks that can be performed by the selected autonomous delivery vehicle while delivering the item.

Figure 1:
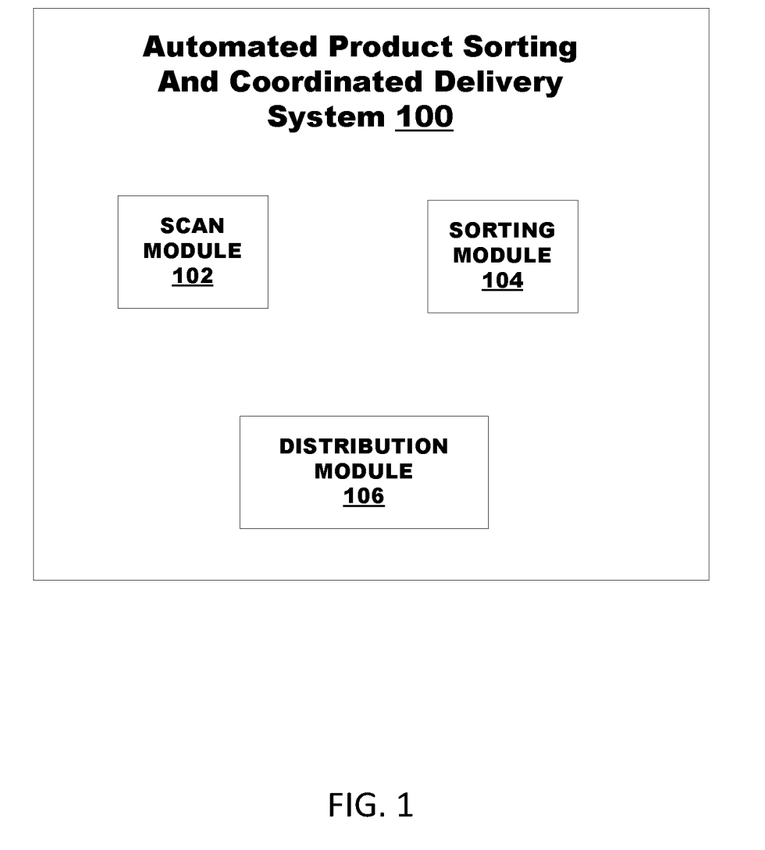
FIG. 1 is a block diagram showing an automated product sorting and coordinated delivery system in terms of modules, according to an example embodiment.

FIG. 1 is a block diagram showing an automated product sorting and coordinated delivery system 100 in terms of modules for an example embodiment. One or more modules may be implemented using server 530 shown in FIG. 5 while other modules may be implemented using computing devices 510, 520 shown in FIG. 5. The modules include a scan module 102, a sorting module 104 and a distribution module 106. The modules may include various circuits, circuitry and one or more software components, programs, applications, or other units of code base or instructions configured to be executed by one or more processors. Although modules 102, 104 and 106 are shown as distinct modules in FIG. 1, it should be understood that modules 102, 104 and 106 may be implemented as fewer or more modules than illustrated. It should be understood that modules 102, 104 and 106 may communicate with one or more components included in system 500 (FIG. 5), such as computing devices 510,520, server 530, and database(s) 540.

The scan module 102 may be a hardware or software-implemented module configured to scan incoming items as they are unloaded and made ready for delivery or storage within a retail facility. The items have machine-readable identifiers which the scan module reads and uses to identify the item and determine how the item should be handled. In one embodiment, the scan module may be part of a FAST system or other automated sorting system.

The sorting module 104 may be a hardware or software-implemented module configured to sort incoming items after they are scanned and made ready for delivery or storage within a retail facility. Depending on the scan of the machine readable identifier, the item is forwarded to the appropriate area where it can be picked up and delivered to the desired location. In one embodiment, the scan module may be part of a FAST system or other automated sorting system and the items may be sorted by being diverted to a conveyor belt associated with the identified category of the item after scanning.

The distribution module 106 may be a hardware or software-implemented module configured to coordinate the delivery of incoming items as they are unloaded. The distribution module identifies a selected autonomous delivery vehicle in the facility to deliver an item and determines an optimal route within the facility. The optimal route determination may be made taking into account one or more of facility traffic patterns, locations of other autonomous delivery vehicles, a number of items being delivered and additional tasks that can be performed while delivering the item. The optimal route determination may take into account customer traffic and autonomous vehicle traffic in the facility.

As non-limiting examples, a real-time database may be used to track the number of customers and location of automated delivery vehicles in the facility. For example, the autonomous delivery vehicle may be equipped with a Bluetooth beacon that broadcasts its ID to sensors disposed at various locations around the facility to enable tracking of vehicle location. In another embodiment, each vehicle may determine its own location and communicate with distribution module 106 via a communication interface. In one embodiment, customer location may be tracked using cameras disposed around the facility to determine areas of congestion. In another embodiment, the customer location may be reported by an app running on a customer handheld device that interacts with sensors in the facility and communicates the customer's location with distribution module 106. The real-time database may also include additional information such as, but not limited to, a layout of the facility and status information relating to power resources and the weight of current item loads of the autonomous delivery vehicles. The real-time database may further include information relating to the capabilities of each individual autonomous delivery vehicle with regards to range and weight limits. The information contained in the real-time database may be consulted by the distribution module when selecting an autonomous delivery vehicle to deliver an item. For example, the distribution module may select the closest autonomous delivery vehicle to the automated sorting system, may select the autonomous delivery vehicle that has the most remaining power, the most available room/weight allowance, or may make the selection based on a combination of these and/or other criteria. Similarly, the distribution module may use the real-time database to pick a route to a tower or other delivery location that has the least number of customers and/or other autonomous vehicles to avoid congestion in the aisles or other locations in the facility. Likewise, the selected autonomous delivery vehicle may be selected based on the ability to pick up multiple items from different conveyors or an additional location in the facility for different orders being delivered to the tower (or other delivery location).

Figure 2:
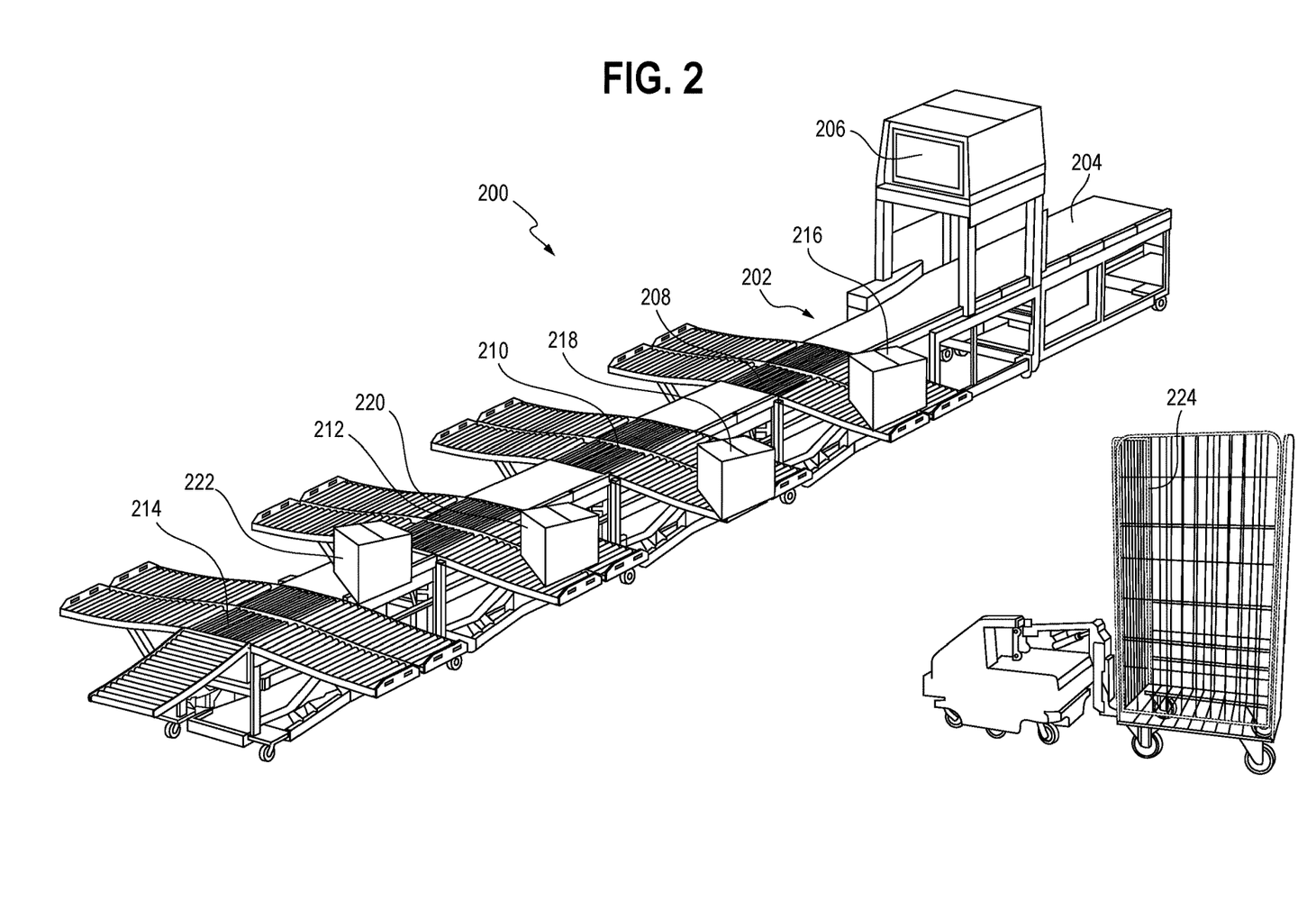
FIG. 2 is a diagram of an exemplary system for providing automated product sorting and coordinated delivery, according to an example embodiment.

FIG. 2 shows a diagram of an exemplary system 200 for providing automated product sorting and coordinated delivery, according to an example embodiment. In one embodiment a receiving system such as a Flexible Automated Sortation Technology (FAST) system 202 is used as part of the unloading of a delivery vehicle into a retail environment. Items are loaded onto the conveyor belt 204 of the FAST system and are scanned by scanner 206. The scanned items are then sorted by control of different sets of rollers and/or additional conveyor belts 208, 210, 212, 214 such that the item is directed to in the appropriate location of the FAST system based on the scanned identifier of the item. For example, each additional set of rollers and/or conveyor belt 208, 210, 212, 214 may be associated with a different category of product.

In this example, the FAST system 202 has received several items 216, 218, 220 and 222. The items are scanned by scanner 206 and a determination is made for each item regarding where the item should be forwarded and stored. In this example, item 216 is identified as having been ordered on-line and is ready to be moved to a tower apparatus for customer pickup. The item 216 is directed by rollers 208 to a location where the item can be picked up by autonomous delivery vehicle 224 for delivery to a tower apparatus.

Item 218 is directed by control of rollers 210 to a pick up spot, for example this is a sporting goods product and needs to be delivered to the sporting goods section of the facility or to a place in the warehouse where sporting goods are stored. Item 220 is directed to a different pickup spot by rollers 212, for example for toys. This item needs to be delivered to the toy section of the facility or to a place in the warehouse where toys are stored. Item 222 is approaching rollers 214 and has yet to be sorted.

Item 216, having been identified as an item for customer pickup, is loaded into autonomous delivery vehicle 224. This may be done manually, or may be done by the autonomous delivery vehicle itself. The autonomous delivery vehicle 224 receives an optimal route for the autonomous delivery vehicle within the facility to a tower apparatus by communicating with the computing device executing the distribution module. The determination of an optimal route, in one embodiment, takes into account one or more of facility traffic patterns, locations of other delivery devices, a number of items to be delivered, and other tasks that can be performed by the autonomous delivery vehicle.

In one embodiment, an optimal route may be determined for the autonomous delivery vehicle and, due to traffic within the route by customers or the location of other autonomous delivery vehicles, the route may be changed to avoid the traffic condition. The route change may be based on an instruction received by the autonomous delivery vehicle from the distribution module or may be based on a condition or event detected by the sensors on-board the autonomous delivery vehicle. Other factors may also be used, for example whether to take three trips with one autonomous delivery vehicle or to have a single trip taken by three autonomous delivery vehicles. Return trips can include pickup of items being returned by the customer and requiring delivery to the warehouse. Other side trips may also be incorporated in to the optimal route, for example, the autonomous delivery vehicle may stop by the baked good area to retrieve a warm loaf of bread to deliver to a checkout station for a customer requesting the item. It will be appreciated that other criteria other than those specifically discussed above may also be used to select an autonomous delivery vehicle and determine an optimal route without departing from the scope of the present invention The autonomous delivery vehicle, with the items loaded thereon, navigates along the optimal route to a tower apparatus where the autonomous delivery vehicle can be unloaded. In some embodiments the autonomous delivery vehicle is loaded with additional items destined for the tower apparatus until a predetermined threshold number of items has been met. The autonomous delivery vehicle in some embodiments is at least one of self-loading and self-unloading. For example, the autonomous delivery vehicle may be equipped with an articulated arm, a grasping claw, an extending apparatus, a ramp or some other mechanism enabling the autonomous delivery vehicle to be self-loading and self-unloading when picking up and/or delivering items.

While the autonomous delivery vehicle is depicted in FIG. 2 as a ground-based autonomous cart used for delivering items to the tower apparatus, it should be appreciated that an aerial drone, an Automated Guided Vehicle (AGV) or another type of ground based autonomous delivery vehicle could also be used. Further, in one embodiment in which the autonomous delivery vehicle is not self-loading and or unloading, the system may automatically notify a facility associate to come and load and/or unload the autonomous delivery vehicle.

Figure 3:
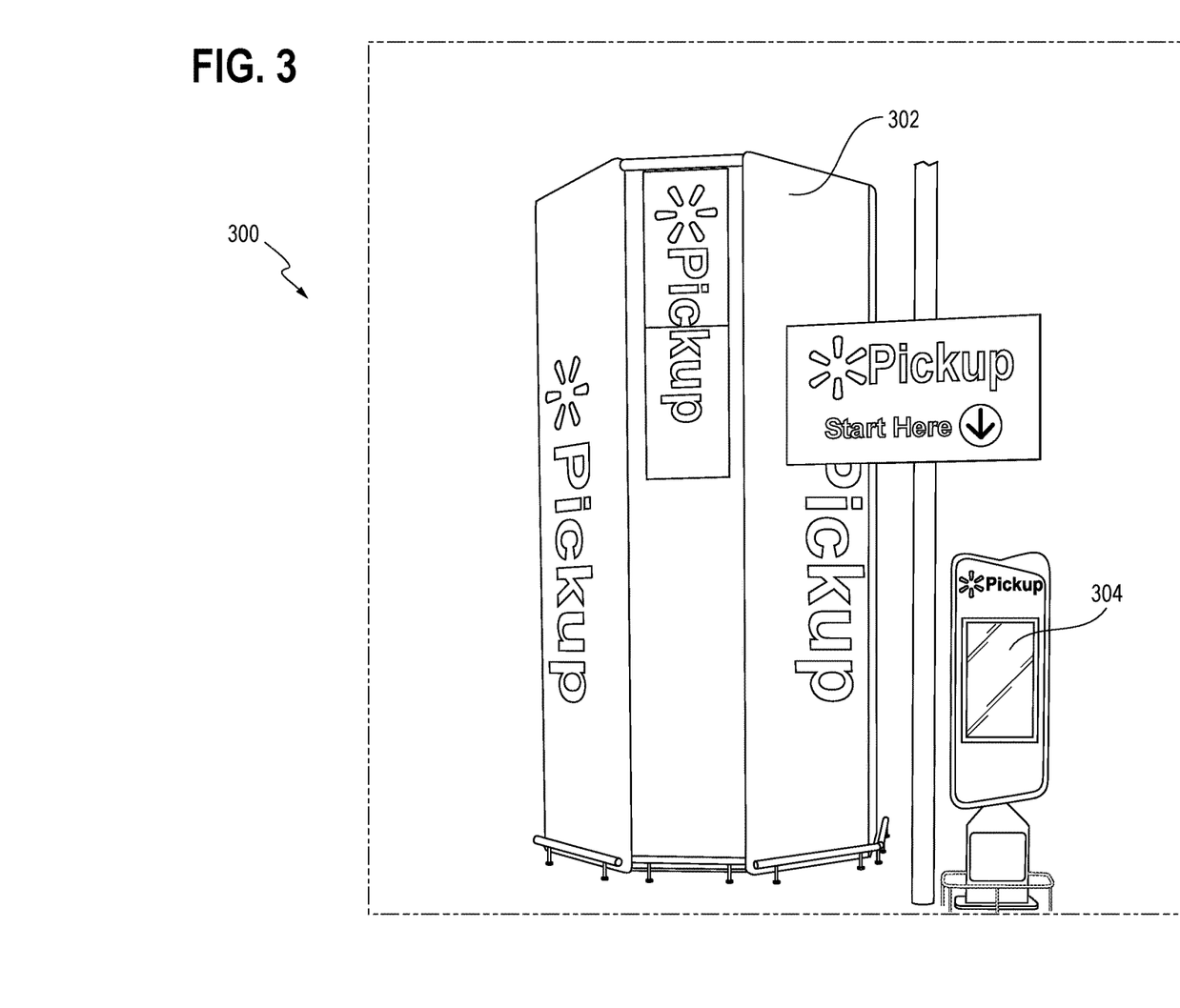
FIG. 3 is a diagram of a tower apparatus used for storing orders for customer pickup, according to an example embodiment.

FIG. 3 is a diagram of a tower apparatus system 300 used for storing orders for customer pickup in an exemplary embodiment. The tower apparatus 302 is physically located at the front area of a facility. The autonomous delivery vehicle unloads its cargo into the rear of the tower apparatus. A customer is notified the item is ready for pickup at the tower apparatus 302. The customer arrives at the pickup station 304 and presents proof of purchase and the item is made available to the customer to retrieve from the tower apparatus. It should be appreciated that instead of a tower apparatus as depicted herein, other specified locations such as lockers or restricted/specified areas of the facility could also be the delivery location for the autonomous delivery vehicle.

Figure 4A:
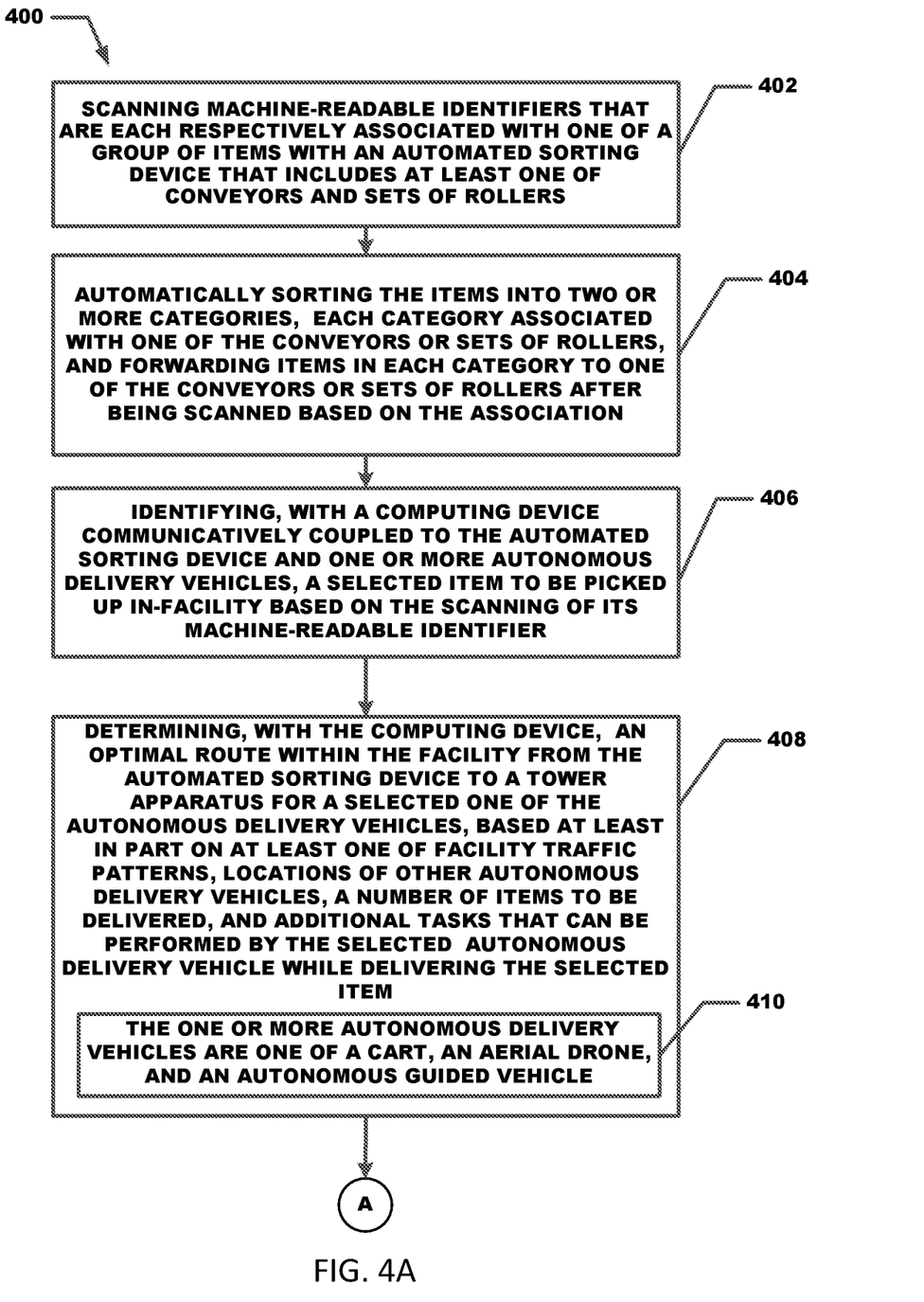
FIGS. 4A and 4B are flowcharts illustrating an exemplary method for automated product sorting and coordinated delivery, according to an example embodiment.
Figure 4B:
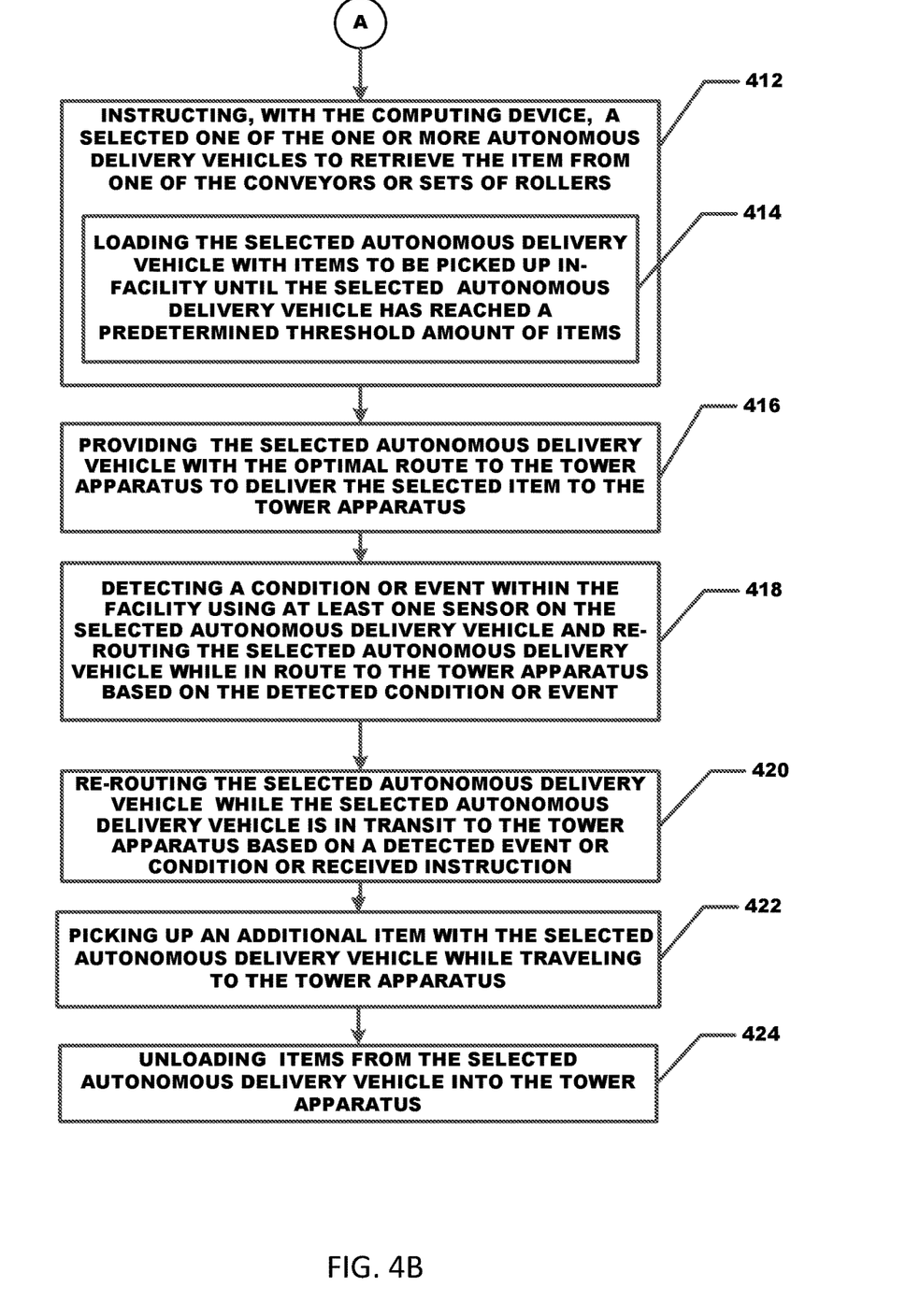

FIGS. 4A and 4B are flow diagrams showing illustrative processing that can be implemented within a system for automated product sorting and coordinated delivery in an exemplary embodiment. FIGS. 4A to 4B are flowcharts illustrating an exemplary method 400 for automated product sorting and coordinated delivery, according to an example embodiment. An automated sorting device scans machine-readable identifiers that are each respectively associated with one of a group of items (step 402). The automated sorting device includes additional conveyors and/or sets of rollers dedicated to different categories of items. The machine readable identifiers may be bar codes, Radio Frequency Identification (RFID) tags or other type of machine-readable codes.

The automated sorting device sorts the scanned items into two or more categories, wherein each category is associated with one of the conveyors and/or sets of rollers, and forwards items in each category to one of the conveyors or sets of rollers after the item is scanned based on the association (step 404). For example, one conveyor and/or set of roller may be for items to be picked up in-facility, while another conveyor may be for delivery to the toy section of the facility, and another conveyor may be dedicated for items being delivered to the women's clothing department.

After scanning, a selected item is identified as an item to be picked up in-facility based on the scan of the machine readable code (step 406). For example, the item may have been ordered at home by a customer online and needs to be delivered to a tower apparatus at the front of the facility for customer pickup. Alternatively, an item can be ordered from a kiosk in the facility and sent to the front of the facility for pickup.

An optimal route within the facility for a selected autonomous delivery vehicle is then determined by the distribution module. The optimal route extends from the automated sorting device to the tower apparatus and is traversed by the selected autonomous delivery vehicle to transport the item to the tower apparatus. The optimal route is based on one or more of facility traffic patterns, locations of other autonomous delivery vehicles, a number of items to be delivered, and additional tasks the autonomous deliver device can perform (step 408). For example, the autonomous delivery vehicle may be, but is not limited to, a cart, an aerial drone or an autonomous guided vehicle (step 410).

The autonomous delivery vehicle is instructed to retrieve the item from the conveyor or sets of rollers to which it was forwarded (step 412). The selected autonomous delivery vehicle may be loaded with items until a predetermined threshold of items have been loaded onto the selected autonomous delivery vehicle (step 414). The predetermined threshold may be one or more of a number of items, a volume of the items, or the weight of the items.

The selected autonomous delivery vehicle is provided with the optimal route to the tower apparatus to deliver the selected item to the tower apparatus (step 416).

In one embodiment, the selected autonomous delivery vehicle can receive a route instruction change from the computing device while the selected autonomous delivery vehicle is in transit to the tower apparatus, and the selected autonomous delivery vehicle changes course while in transit to the tower apparatus based on the instruction. In another embodiment, the selected autonomous delivery vehicle may identify an event or condition in the facility through the use of onboard sensors such as radar, LIDAR, ultrasound or another type of sensor that is used to detect congestion on the optimal route and automatically switch to an alternate route to the tower.

In some embodiments the autonomous delivery vehicle may pick up additional items while in route to the tower apparatus (step 422). The autonomous delivery vehicle is unloaded after arrival at the tower apparatus (step 424). In one embodiment, prior to the autonomous delivery vehicle being unloaded, the autonomous delivery vehicle communicates with the tower apparatus to confirm its identity before the tower opens a doorway or window to accept delivery. For example, the autonomous delivery vehicle may electronically communicate its ID or provide a scannable identifier read by the tower apparatus.

Although the description herein has focused on a tower apparatus as the delivery location for the autonomous delivery vehicle, it should be appreciated that other locations in the facility such as a delivery locker or other specified location could also be used without departing from the scope of the present invention.

Figure 5:
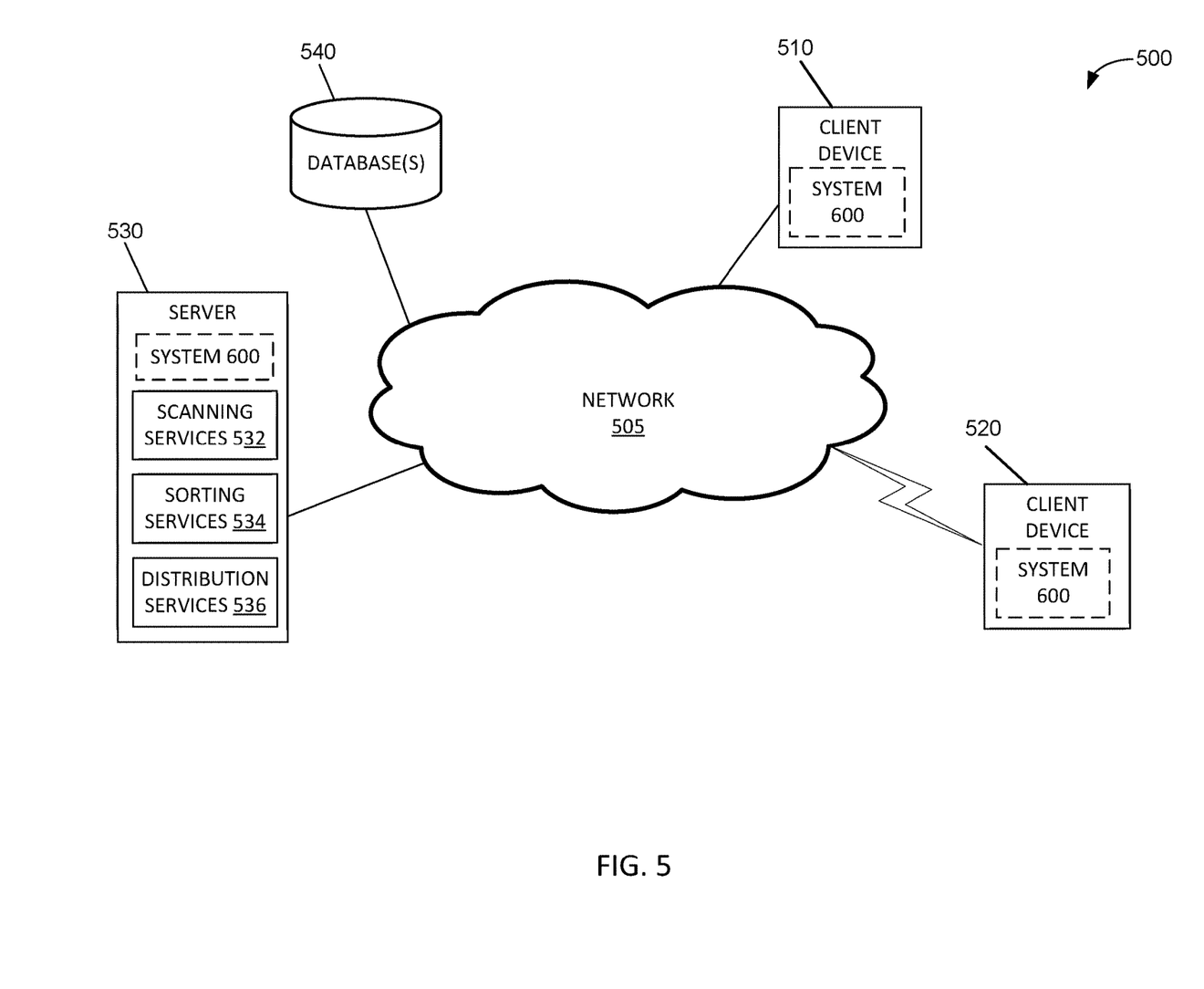
FIG. 5 is a diagram of an exemplary network environment suitable for implementation of exemplary embodiments.

FIG. 5 illustrates a network diagram depicting a system 500 for implementing an automated product sorting and coordinated delivery system, according to an example embodiment. The system 500 can include a network 505, multiple computing devices, for example, computing device 510, computing device 520, a server 530, and database(s) 540. Each of the computing devices 510, 520, server 530, and database(s) 540 is in communication with the network 505.

In an example embodiment, one or more portions of network 505 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

The computing devices 510, 520 may comprise, but are not limited to, mobile devices, hand-held devices, wireless devices, portable devices, wearable computers, cellular or mobile phones, portable digital assistants (PDAs), smart phones, smart watches, tablets, ultrabooks, netbooks, laptops, desktops, multi-processor systems, microprocessor-based or programmable consumer electronics, and the like. Each of computing devices 510, 520 may connect to network 505 via a wired or wireless connection. In an example embodiment, the computing devices 510, 520 may perform one or more of the functionalities of the automated product sorting and coordinated delivery system 100 described herein, or transmit data or signals to the automated product sorting and coordinated delivery system 100 described herein. The computing device 510, 520 can include one or more components of computing device 600 of FIG. 6.

In an example embodiment, the automated product sorting and coordinated delivery system 100 may be included at least in part on the computing device 510, 520, and the computing device 510, 520 performs one or more of the functionalities of the system described herein. In an example embodiment, the automated product sorting and coordinated delivery system 100 may be included at least in part on the server 530, and the server 530 performs one or more of the functionalities of the automated product sorting and coordinated delivery system 100 described herein.

The database(s) 540 comprise one or more storage devices for storing data and/or instructions (or code) for use by the server 530 and/or the computing devices 510, 520. Each of the database(s) 540 and the server 530 is connected to the network 505 via a wired connection. Alternatively, one or more of the database(s) 540 and server 530 may be connected to the network 505 via a wireless connection. The server 530 includes one or more processors configured to communicate with the computing devices 510, 520 via network 505. The server 530 can include one or more components of device 600 of FIG. 6. Server 530 hosts one or more software systems, applications or websites, including one or more components of the dynamic delivery system 100 described herein and/or facilitates access to the content of database(s) 540.

In an example embodiment, the server 530 also includes various software services that facilitate the functionalities of the automated product sorting and coordinated delivery system 100. Database(s) 540 and server 530 may be located at one or more geographically distributed locations from each other or from computing devices 510, 520. Alternatively, database(s) 540, 545 may be included within server 530.

Figure 6:
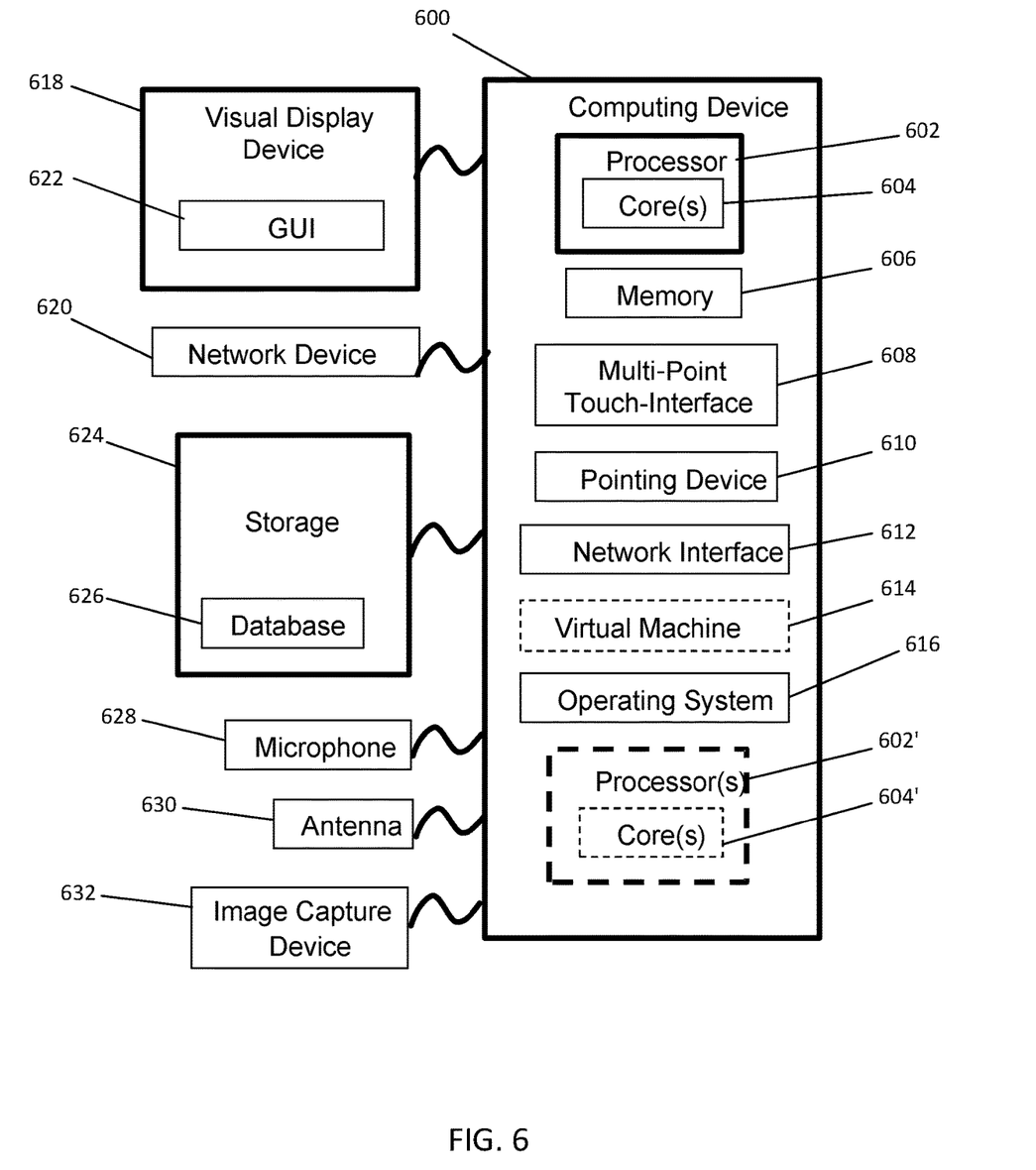
FIG. 6 is a block diagram of an exemplary computing device that may be used to implement exemplary embodiments described herein.

FIG. 6 is a block diagram of an exemplary computing device 600 that can be used to perform one or more steps of the methods provided by exemplary embodiments. For example, computing device 600 may be the computing device 510, 520 and the server 530 as described in FIG. 5 and may be implemented at least in part on one or more of the autonomous delivery vehicles. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash drives), and the like. For example, memory 606 included in the computing device 600 can store computer-readable and computer-executable instructions or software for implementing exemplary embodiments. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 6902 and processor(s) 602' can each be a single core processor or multiple core (704 and 604') processor.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof. An individual can interact with the computing device 600 through a visual display device 618, such as a touch screen display or computer monitor, which can display one or more user interfaces 619 for receiving data from the individual (e.g., order data and travel data). The visual display device 618 can also display other aspects, elements and/or information or data associated with exemplary embodiments. The computing device 600 can include other I/O devices for receiving input from an individual, for example, a keyboard or another suitable multi-point touch interface 608, a pointing device 610 (e.g., a pen, stylus, mouse, or trackpad). The keyboard 608 and the pointing device 610 can be coupled to the visual display device 618. The computing device 600 can include other suitable conventional I/O peripherals.

The computing device 600 can also include one or more storage devices 624, such as a hard-drive, CD-ROM, or other computer readable media, for storing data and computer-readable instructions and/or software, such as one or more modules of the system 100 shown in FIG. 1 that implements exemplary embodiments of the notification system as described herein, or portions thereof, which can be executed to generate user interface 619 on display 618. Exemplary storage device 624 can also store one or more databases for storing suitable information required to implement exemplary embodiments. The databases can be updated by an individual or automatically at a suitable time to add, delete or update one or more items in the databases. Exemplary storage device 624 can store one or more databases 926 for storing provisioned data, and other data/information used to implement exemplary embodiments of the systems and methods described herein.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or another device suitable for interfacing the computing device 600 to a type of network capable of communication and performing the operations described herein. Moreover, the computing device 600 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run an operating system 616, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 616 can be run in native mode or emulated mode. In an exemplary embodiment, the operating system 616 can be run on one or more cloud machine instances.

The description is presented to enable a person skilled in the art to create and use a computer system configuration and related method and systems for automated product sorting and coordinated delivery. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A system for automated product sorting and coordinated delivery using autonomous delivery vehicles within a facility, comprising:
an automated sorting device configured to:
scan a plurality of items; and
automatically sort the plurality of items into two or more predetermined categories;
an in-facility location configured for retrieval of one or more items intended for pick up at the facility;
one or more autonomous delivery vehicles;
a computing device communicatively coupled to the automated sorting device and the one or more autonomous delivery vehicles and configured to execute a distribution module, the distribution module when executed:
identifying a selected item from the plurality of items to be picked up in-facility,
determining a route within the facility from the automated sorting device to the in-facility location for a selected one of the one or more autonomous delivery vehicles based at least in part on at least one of facility traffic patterns, locations of other autonomous delivery vehicles, a number of items to be delivered, and additional tasks that can be performed by the selected one of the one or more autonomous delivery vehicles while delivering the item, and
instructing the selected one of the one or more autonomous delivery vehicles to retrieve the item from the automated sorting device;
wherein the selected one of the one or more autonomous delivery vehicles navigates the route in the facility from the automated sorting device to the in-facility location to deliver the selected item to the in-facility location.

2. The system of claim 1 wherein the distribution module instructs the selected one of the one or more autonomous delivery vehicles to retrieve multiple items to be picked up in-facility until the selected one of the one or more autonomous delivery vehicles has reached a predetermined threshold amount of items.

3. The system of claim 1 wherein the selected one of the one or more autonomous delivery vehicles is one of a cart, an aerial drone, and an autonomous guided vehicle.

4. The system of claim 1 wherein the selected one of the one or more autonomous delivery vehicles is re-routed while in transit to the in-facility location based on instructions received from the distribution module or based on an event or condition detected by one or more sensors on the selected one of the one or more autonomous delivery vehicles.

5. The system of claim 1 wherein the selected one of the one or more autonomous delivery vehicles picks up an additional item while on the route to the in-facility location.

6. The system of claim 1 wherein the selected one of the one or more autonomous delivery vehicles is unloaded into the in-facility location.

7. The system of claim 1,
wherein the automated sorting device further comprises at least one of a plurality of conveyors and sets of rollers, and
wherein the automated sorting device is configured to:
scan a plurality of machine-readable identifiers that are each respectively associated with one of the plurality of items; and
automatically sort the plurality of items into two or more predetermined product categories, each category associated with one of the plurality of conveyors or sets of rollers, items in each category forwarded to one of the plurality of conveyors or sets of rollers after being scanned based on the association.

8. A computer-implemented method for automated product sorting and coordinated delivery using autonomous delivery vehicles within a facility, the method comprising:
scanning, with an automated sorting device, a plurality of items;
automatically sorting, with the automated sorting device, the plurality of items into two or more predetermined categories;
identifying, with a computing device communicatively coupled to the automated sorting device and one or more autonomous delivery vehicles, a selected item from the plurality of items to be picked up in-facility;
determining, with the computing device, a route within the facility from the automated sorting device to an in-facility location for a selected one of the one or more autonomous delivery vehicles based at least in part on at least one of facility traffic patterns, locations of other autonomous delivery vehicles, a number of items to be delivered, and additional tasks that can be performed by the selected one of the one or more autonomous delivery vehicles while delivering the item, the in-facility location being configured for pick up of one or more items by customers in the facility;
instructing, with the computing device, a selected one of the one or more autonomous delivery vehicles to retrieve the item from the automated sorting device; and
providing the selected one of the one or more autonomous delivery vehicles with the route in the facility from the automated sorting device to the in-facility location to deliver the selected item to the in-facility location.

9. The method of claim 8, further comprising:
loading the selected one of the one or more autonomous delivery vehicles with items to be picked up in-facility until the selected one of the one or more autonomous delivery vehicles has reached a predetermined threshold amount of items.

10. The method of claim 8 wherein the one or more autonomous delivery vehicles are one of a cart, an aerial drone, and an autonomous guided vehicle.

11. The method of claim 8 further comprising:
detecting a condition or event within the facility using at least one sensor on the selected one of the one or more autonomous delivery vehicles; and
re-routing the selected one of the one or more autonomous delivery vehicles while on the route to the in-facility location based on the detected condition or event.

12. The method of claim 8 further comprising:
receiving with the selected one of the one or more automated delivery vehicles a route instruction change from the computing device while the selected one of the one or more automated delivery vehicles is in transit to the in-facility location; and
re-routing the selected one of the one or more autonomous delivery vehicles while in transit to the in-facility location based on the instruction.

13. The method of claim 8 further comprising:
picking up an additional item with the selected one of the one or more autonomous delivery vehicles while on the route to the in-facility location.

14. The method of claim 8 further comprising:
unloading items from the selected one of the one or more autonomous delivery vehicles into the in-facility location.

15. The method of claim 8,
wherein the automated sorting device further comprises at least one of a plurality of conveyors and sets of rollers, and
further comprising, by the automated sorting device:
scanning a plurality of machine-readable identifiers that are each respectively associated with one of the plurality of items; and
automatically sorting the plurality of items into two or more predetermined product categories, each category associated with one of the plurality of conveyors or sets of rollers, items in each category forwarded to one of the plurality of conveyors or sets of rollers after being scanned based on the association.

16. A non-transitory machine-readable medium storing instructions executable by a processing device, wherein execution of the instructions causes the processing device to implement an automated product sorting and coordinated delivery method, the method comprising:
scanning, with an automated sorting device, a plurality items;
automatically sorting, with the automated sorting device, the plurality of items into two or more product categories;
identifying, with a computing device communicatively coupled to the automated sorting device and one or more autonomous delivery vehicles, a selected item from the plurality of items to be picked up in-facility;
determining, with the computing device, a route within the facility from the automated sorting device to an in-facility location for a selected one of the one or more autonomous delivery vehicles based at least in part on at least one of facility traffic patterns, locations of other autonomous delivery vehicles, a number of items to be delivered, and additional tasks that can be performed by the selected one of the one or more autonomous delivery vehicles while delivering the item, the in-facility location being configured for pick up of one or more items by customers in the facility;
instructing, with the computing device, a selected one of the one or more autonomous delivery vehicles to retrieve the item from the automated sorting device; and
providing the selected one of the one or more autonomous delivery vehicles with the route in the facility from the automated sorting device to the in-facility location to deliver the selected item to the in-facility location.

17. The non-transitory machine-readable medium of claim 16 wherein instructing the autonomous delivery vehicle to retrieve the item from one of the plurality of conveyors or rollers comprises loading the selected one of the one or more autonomous delivery vehicles with items to be picked up in-facility until the selected one of the one or more autonomous delivery vehicles has reached a predetermined threshold amount of items.

18. The non-transitory machine-readable medium of claim 16 further comprising:
detecting a condition or event within the facility using at least one sensor on the selected one of the one or more autonomous delivery vehicles; and
re-routing the selected one of the one or more autonomous delivery vehicles while on the route to the in-facility location based on the detected condition or event.

19. The non-transitory machine-readable medium of claim 16 wherein the selected one of the one or more autonomous delivery vehicles picks up an additional item while on the route to the in-facility location.

20. The non-transitory machine-readable medium of claim 16 further comprising picking up an additional item with the selected one of the one or more autonomous delivery vehicles while on the route to the in-facility location.

* * * * *